(12) United States Patent
Oka

(10) Patent No.: US 6,563,508 B1
(45) Date of Patent: May 13, 2003

(54) SYSTEM FOR AND METHOD OF IMPLEMENTING REFRACTION MAPPING

(75) Inventor: Masaaki Oka, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 0 days.

(21) Appl. No.: 09/506,885

(22) Filed: Feb. 18, 2000

(30) Foreign Application Priority Data

Feb. 19, 1999 (JP) .......................................... 11-040977

(51) Int. Cl.$^7$ ............................................... G06T 11/40
(52) U.S. Cl. ........................ 345/586; 345/582; 345/647
(58) Field of Search ................................ 345/582, 583, 345/584, 585, 586, 607, 647, 161

(56) References Cited

U.S. PATENT DOCUMENTS

| | | | | |
|---|---|---|---|---|
| 6,049,337 A | * | 4/2000 | Van Overveld | 345/582 |
| 6,256,047 B1 | * | 7/2001 | Isobe et al. | 345/158 |

FOREIGN PATENT DOCUMENTS

| | | |
|---|---|---|
| EP | 0 447 222 A2 | 9/1991 |
| EP | 0 473 152 A2 | 3/1992 |
| EP | 0 666 548 A1 | 8/1995 |
| JP | 61-210395 | 9/1986 |
| JP | 05-101161 | 4/1993 |
| JP | 10208067 | 8/1998 |
| JP | 11003432 | 1/1999 |
| WO | WO 97/34213 | 9/1997 |

* cited by examiner

*Primary Examiner*—Michael Razavi
*Assistant Examiner*—Javid Amini
(74) *Attorney, Agent, or Firm*—Lerner, David, Littenberg, Krumholz & Mentlik, LLP

(57) ABSTRACT

A system performs refraction mapping for an image having an object, the object being viewed along at least one line of sight and at least partially through a boundary of first and second at least semi-transparent media. The boundary defines at least one normal vector at one or more intersections of the line of sight and the boundary. The system includes: a perspective transformation unit operable to project a three-dimensional version of the object on a two-dimensional texture plane using a perspective view transformation algorithm to obtain texture addresses of the object, the texture plane being perpendicular to the line of sight and the transformation being performed without regard to refraction; and a refraction determination unit operable to obtain at least one refraction vector for at least one of the texture addresses, a given refraction vector being a function of a component of the at least one normal vector that is parallel to the texture plane.

5 Claims, 13 Drawing Sheets

(CONVENTIONAL REFRACTION MAPPING)

(CONVENTIONAL REFRACTION MAPPING)

(WHEN THERE IS NO WATER)

(WHEN THERE IS WATER)

SYSTEM FOR AND METHOD OF IMPLEMENTING REFRACTION MAPPING

BACKGROUND OF THE INVENTION

The present invention relates to a refraction mapping technique for producing an image as if looking at an object subject to refraction. The technique may be used for example, in information equipment which includes an entertainment system such as a video game device or the like.

In a video game device, when looking at the bottom of the sea through the water surface, it looks like the bottom of the sea is distorted due to refraction. Refraction mapping is known as a method of producing a realistic picture by simulating the refraction as described above.

It is required in conventional refraction mapping for a land portion protruding from the water surface and a portion under the water to implement separately a parallel projection rendering, in a vertical direction onto the water surface, thereby making the burden on a central processing unit (CPU), a graphic processing unit (GPU) and the like to be large.

SUMMARY OF THE INVENTION

Accordingly, in the light of the above-mentioned problems, it is an object of the present invention to provide a system for and a method of implementing a refraction mapping with an easy method, as well as a recording medium for the method.

A system for implementing a refraction mapping according to the present invention, includes means for perspective-projecting an object, and for producing a two-dimensional texture of the object for a texture plane; and means for determining a refracted texture address that displaces according to a refraction phenomena, for at least a portion of the texture, wherein the refracted texture address is determined, depending on a normal vector at a boundary surface of different media and a visual line vector.

It is preferable that, in the above-described system for implementing the refraction mapping according to the present invention, the refracted texture address is determined by an angle formed with the normal vector and the visual line vector or a component of the normal vector that is parallel to the texture plane.

Preferably, in the above-described system for implementing the refraction mapping according to the present invention, as a normal vector at an intersection point of the boundary surface of at least two different media and the visual line vector is defined to be n, and as the visual line unit vector is defined to be v, determining a variable k so that the sum (n+kv) of the normal vector n and the value kv of which the visual line unit vector v is multiplied by a variable k becomes parallel to the texture plane, and the texture address is displaced by an amount of a constant multiplication of (n+kv), that is L (n+kv).

Further, the texture address may be displaced with only an amount of L $(n_x, n_y)$ of which two components $(n_x, n_y)$ parallel to the texture plane of the normal vector n are multiplied by a constant L.

At this moment, at least two different media may represent the ones with different refractive indices such as an air, water or a glass.

It is preferable that, the above-described system for implementing the refraction mapping according to the present invention, further includes means for displacing at least a portion of a texture, based on the refracted texture address; and means for perspective-transforming on a screen, using this displaced texture.

In such system, the object has a portion projecting from the water surface, and a portion sinking under the water, and for at least a portion of the texture associated with the portion sinking under the water, a refracted texture address that is to be displaced according to a refraction phenomena can be determined.

Further, such system is preferably provided in a video game device.

In the above-described system for implementing the refraction mapping, the texture plane is defined on a plane perpendicular to the Z-axis that is in a visual line direction of a view point coordinate system, and for example, it makes possible to rendering the part (the water bottom part) under the water surface with the same procedure as the perspective projection of the land part protruding from the water surface of the topography, and as a result, a creation of a texture for use in a refraction can be made by implementing collectively the land part and the water bottom part with just one rendering.

According to this system for implementing the rendering, an amount of a displacement by a refraction phenomena will not satisfy the Snell's law generated exactly, regarding the picture of the water bottom part under the water. However, as obtaining an amount of a displacement that is an approximate to the Snell's law using an easy method, it makes possible to qualitatively rendering the water bottom part under the water.

Further, a method of implementing a refraction mapping according to the present invention includes the steps of: perspective-projecting an object, and producing a two-dimensional texture of the object for a texture plane; and determining a refracted texture address that displaces according to a refraction phenomena, for at least a portion of the texture, wherein the refracted texture address is determined, depending on a normal vector at a boundary surface of different media and a visual line vector.

Preferably, in the method of implementing the refraction mapping according to the present invention, the refracted texture address is determined by an angle formed with the normal vector and the visual line vector or a component of the normal vector that is parallel to the texture plane.

In the method of implementing the refraction mapping according to the present invention, as a normal vector at an intersection point of the boundary surface of at least two different media and the visual line vector is defined to be n, and as the visual line unit vector is defined to be v, determining a variable k so that the sum (n+kv) of the normal vector n and the value kv of which the visual line unit vector v is multiplied by a variable k becomes parallel to the texture plane, the refracted texture address is displaced by an amount of a constant multiplication of (n+kv), that is L (n+kv).

Moreover, the refracted texture address may be displaced with only an amount of L $(n_x, n_y)$ of which two components $(n_x, n_y)$ parallel to the texture plane of the normal vector n are multiplied by a constant L.

Further objects and advantages of the invention can be more fully understood from the following detailed description taken in conjunction with the accompanying drawings in which:

DESCRIPTION OF THE PREFERRED EMBODIMENTS

An entertainment system, which is capable of implementing a refraction mapping according to the present invention, will now be described briefly with reference to the accompanying drawings.

Figure 1:
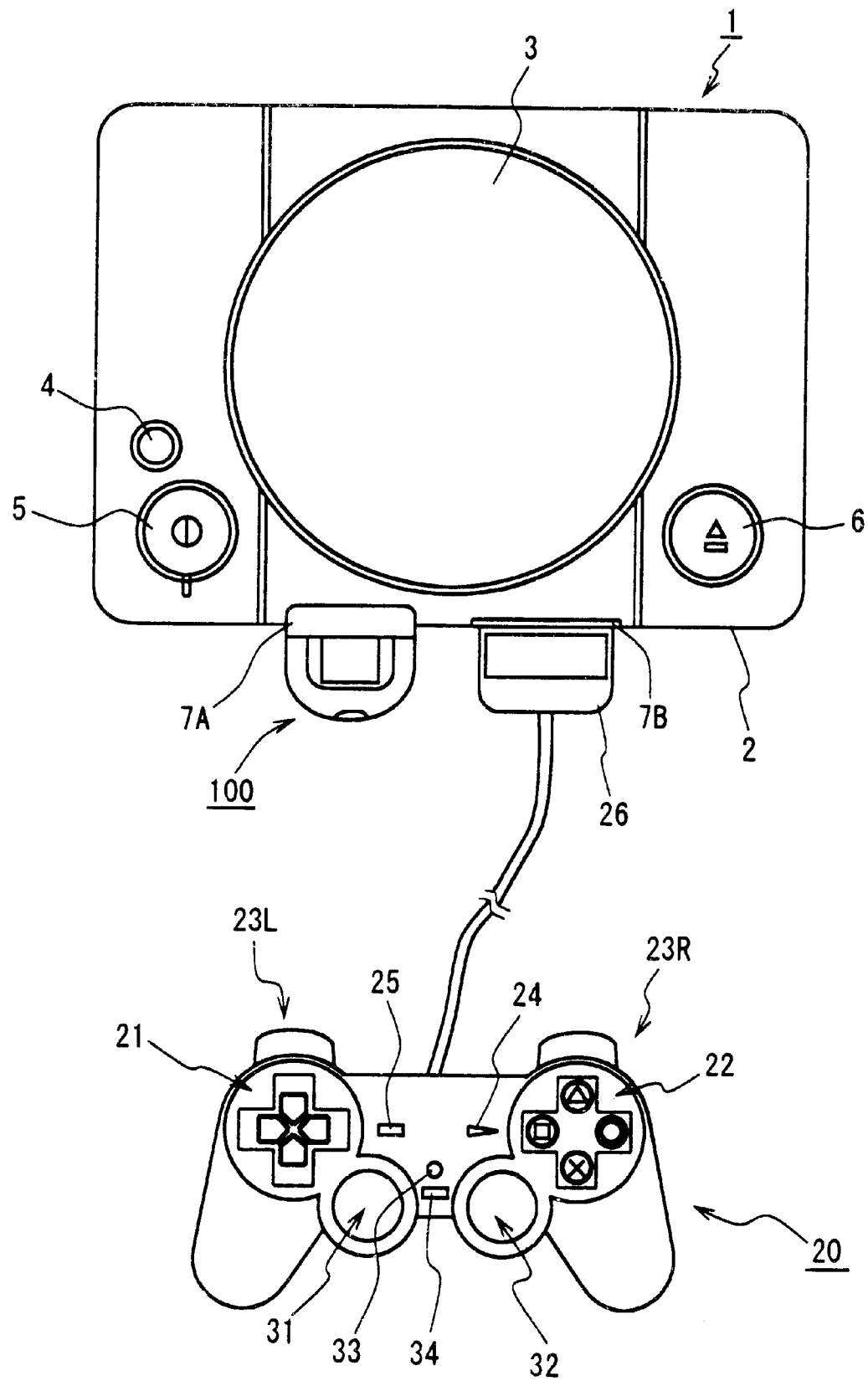
FIG. 1 is a plane view showing an appearance of an entertainment system including a master machine (a video game machine) and a slave machine (portable electronics equipment)

FIG. 1 shows a video game device, as one example of the entertainment system. This video game device 1 is for reading a game program recorded on an optical disk or the like, for example, and for implementing it in response to an instruction from a user (a game player). Further, an implementation of the game means mainly to control an advance of the game, and a display or a voice (audio) thereof.

The main body 2 of the video game device 1 is configured, for example, to include a disk mounting unit 3 in which an optical disk such as a CD-ROM or the like is attached to a central portion thereof, the optical disk being a recording medium for supplying an application program such as a video game or the like, a reset switch 4 for optionally resetting the game, a power supply switch 5, a disk operation switch 6 for operating a mounting of the optical disk, and two slot units 7A, 7B.

Slot units 7A, 7B, enable connection to two operation devices 20, 50 that two users can play a match game or the like. Further, to these slot units 7A, 7B, a memory card device may be inserted which is capable of saving (storing) or reading a game data, and/or a portable electronics equipment which is capable of implementing a game by detaching from the main body.

An operation device 20 includes first and second operation units 21, 22, a L button 23L, a R button 23R, a start button 24, a selection button 25, and further includes operation units 31, 32 with which it enables analog operations, a mode selection switch 33 for selecting operation modes of these operation units 31, 32, and a display unit 34 for displaying the operation modes selected.

Figure 2:
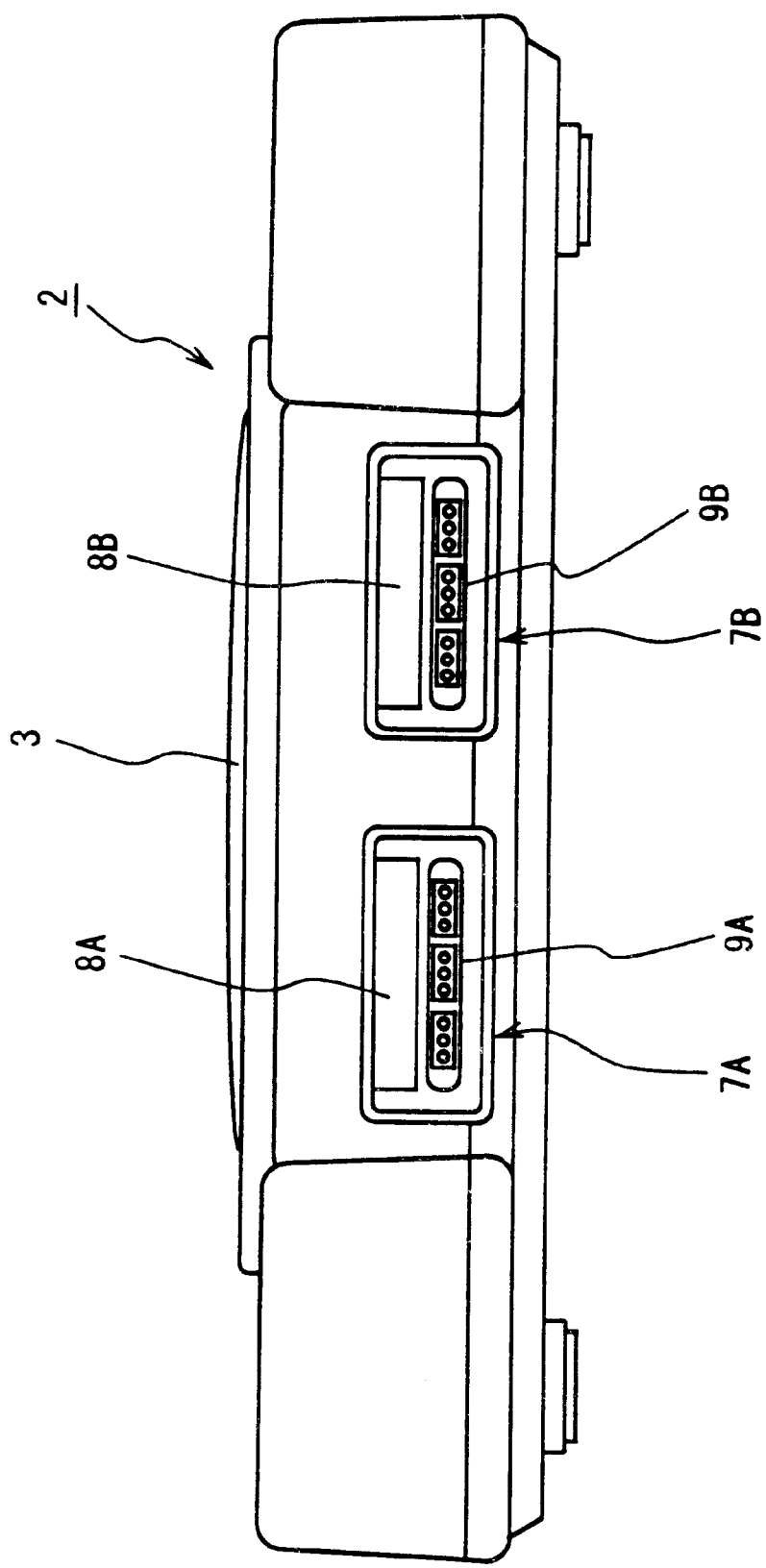
FIG. 2 is a backside view of the master machine (the video game machine)

FIG. 2 shows the slot units 7A, 7B provided at the front of the main body 2 in the video game device 1. The slot units 7A, 7B are formed in two stages, respectively, and memory card insertion units 8 A, 8 B into which memory cards 10 and/or portable electronics equipments 100 are inserted are provided in the upper stages thereof, as well as controller connection units (jacks) 9A, 9B to which connection terminal units (connectors) 26 of controllers 20 are provided in the lower stages thereof.

The insertion holes (slots) of the memory card insertion units 8A, 8B are formed slightly non-symmetrical so that the memory cards are not miss-inserted. The controller connection units 9A, 9B are also formed slightly non-symmetrical so that the connection terminals 26 of the controllers 20 are not miss-connected, and further the insertion holes thereof are configured as to have different shapes from the memory card insertion units 8A, 8B so that the memory cards are not miss-inserted.

Figure 3:
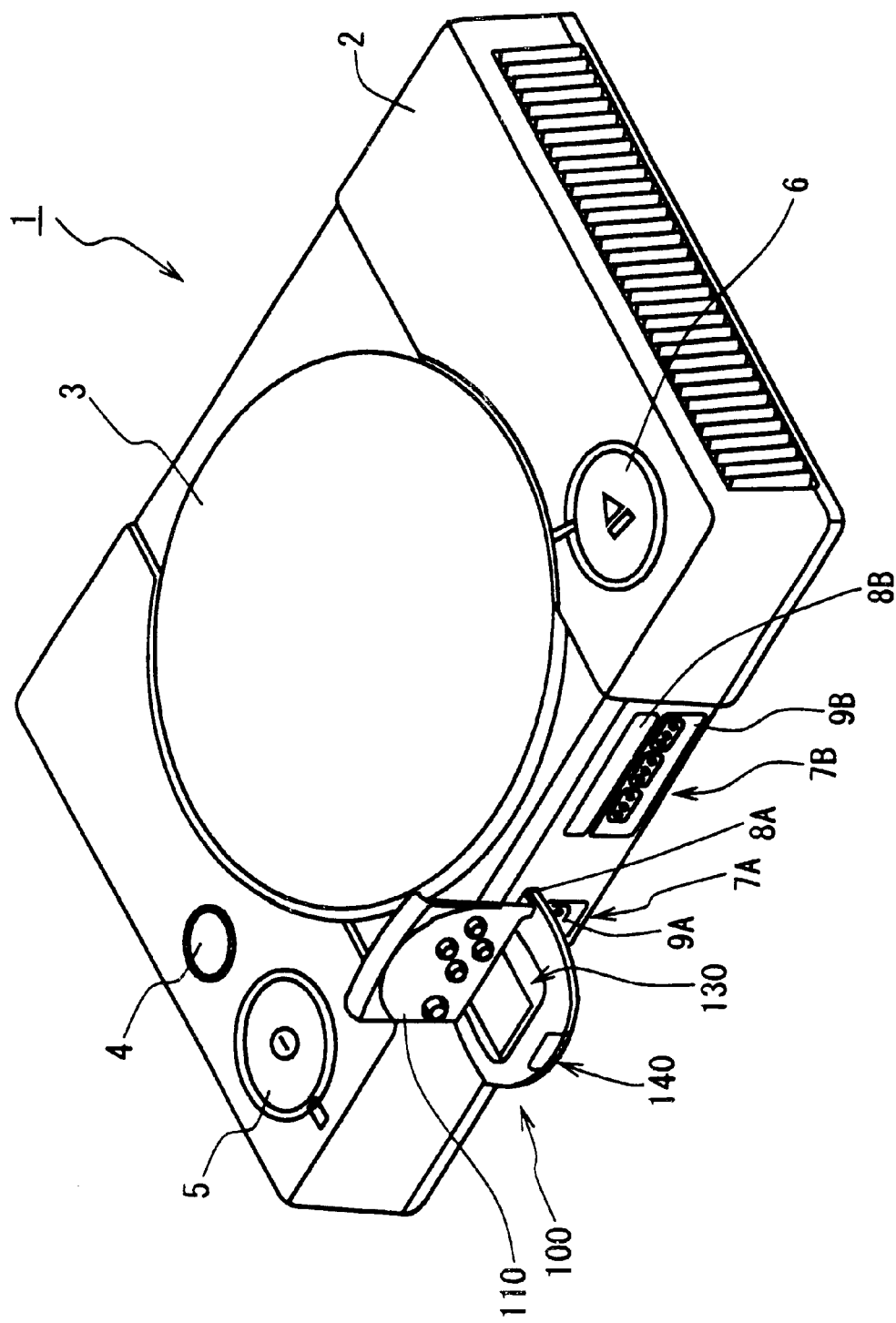
FIG. 3 is an appearance perspective view of the master machine (the video game machine)

FIG. 3 shows the portable electronics equipment 100 inserted into the memory card insertion unit 8A of the slot unit 7A at the front of the video game machine 1.

Figure 4:
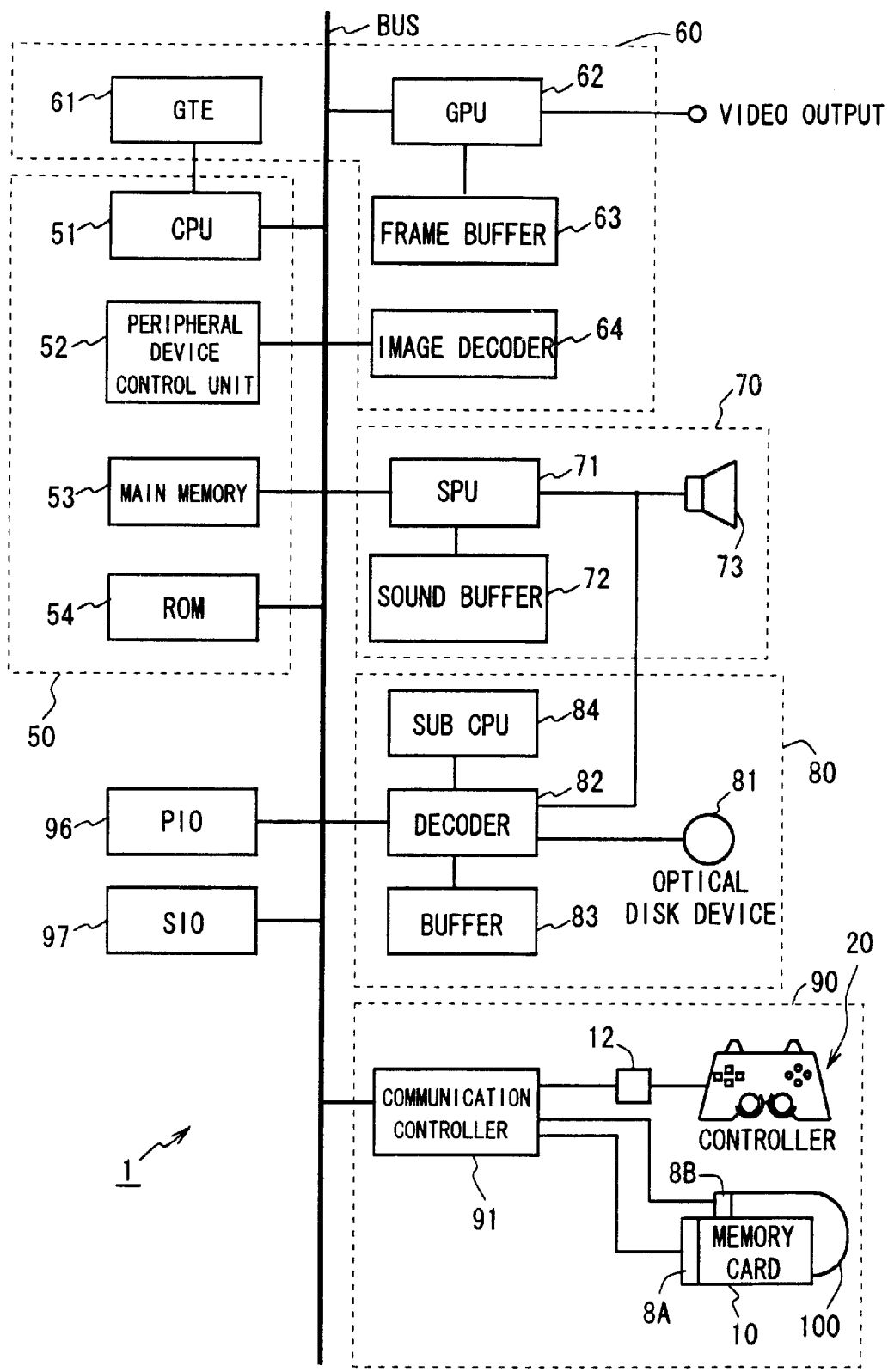
FIG. 4 is a block diagram showing a configuration of the main part of the master machine (the video game machine)

FIG. 4 is a block diagram showing one example of a schematic circuit configuration of the main part of the video game device 1.

This video game device 1 is configured to include a control system 50 including a central processing unit (CPU) 51 and peripheral devices, a graphic system 60 including a graphic processing unit (GPU) 62 for performing drawings onto a frame buffer 63, a sound system 70 including a sound processing unit (SPU) for generating musical sound, a sound effect and the like, an optical disk control unit 80 for performing a control of the optical disk into which application programs are recorded, a communication control unit 90 for controlling the memory card 10 which stores a signal from the controller 20 in which an instruction from a user and the settings and the like of the data, and the input/output of data from the portable electronics equipment 100, and a bus (BUS) to which each of the above-mentioned units is connected.

The control system 50 includes the CPU 51, a peripheral device control unit 52 for performing control of an interruption and control of a dynamic memory access (DMA) and the like. System 50 also includes a main memory 53 including a random access memory (RAM), and a read only memory (ROM) 54 which stores a program such as a so-called operating system and the like that performs management of the main memory 53, the graphic system 60, the sound system 70 and the like. Further, the main memory 53 enables the execution of a program.

The CPU 51 controls the entire video game device 1, by executing the operating system stored in the ROM 54, and is composed of a 32-bit RISC-CPU.

This video game device 1 is configured such that when being energized, as the CPU 51 in the control system 50 executes the operating system stored in the ROM 54, the CPU 51 implements a control of the graphic system 60, the sound system 70 and the like.

Further, when the operating system is executed, the CPU 51 controls the optical disk control unit 80 so as to execute the application program such as the game recorded on the optical disk, after having initialized the video game device 1 such as an operation confirmation and the like. Executing a program such as a game, the CPU 51 controls the graphic system 60 the sound system 70 in response to an input from a user, so as to control a display of an image and generations of a sound, such as a musical sound.

Moreover, the graphic system 60 includes a geometry transfer engine (GTE) 61 for implementing a process of coordinate transfer and the like, a GPU 62 for implementing a drawing in accordance with a drawing instruction from the CPU 51, a frame buffer 63 for storing an image drawn by the GPU 62, and an image decoder 64 for decoding image data that is compressed and encoded by an orthogonal transform such as a discrete cosine transformation (DCT) or the like.

The GTE 61 includes a parallel arithmetic mechanism for executing multiple arithmetic operations in parallel, for example, and is operable to perform high speed arithmetic operations such as coordinate transformation, light source calculation, matrix and vector operations in response to arithmetic demands from the CPU 51.

Concretely, this GTE 61 is, for example, operable to perform coordinate arithmetic operations for a maximum of 1500,000 polygons/second, in the case of implementing flat shading for one triangle-shaped polygon with an identical color. As a result, with this video game device, a reduced load of the CPU 51 as well as high speed coordinate arithmetics are achieved.

Further, the GPU 62 implements a drawing of a polygon and the like for the frame buffer 63, in accordance with the drawing command from the CPU 51. The GPU 62 is operable to perform drawing for a maximum of 360,000 polygons/second.

Moreover, the frame buffer 63 is composed of a so-called dual port RAM, and is operable to perform drawing from the GPU 62, transfer from the main memory, as well as reading for a display simultaneously. This frame buffer 63, for example, has a capacity of 1 M bytes, each of which is treated as a 16-bit matrix with a row of 1024 pixels and a column of 512 pixels. Furthermore, in the frame buffer 63 includes a display area to be outputted as a video output, a GLUT area into which a color look up table that is to be referred to at a time when the GPU 62 draws a polygon and the like is stored, and a texture area into which a material (texture) that is inserted (mapped) into a polygon and the like that arc drawn by the GPU 62 as being coordinate-transformed at a time of drawing. These CLUT area and texture area are configured as being dynamically changed in accordance with a change of the display area and the like. Further, the GPU 62 is operable to perform glow shading that determines a color within a polygon by complementing from a color at a vertex of the polygon (besides the above-described flat shading), as well as a texture mapping for pasting a texture stored in the texture area onto a polygon. When implementing glow shading or texture mapping, the GTE 61 is operable to perform coordinate Arithmetic operations of a maximum 500,000 polygons/second.

Moreover, the image decoder 64 decodes an image data of a still picture or animation stored in the main memory 53 and stores it into the main memory 53 according to a control from the CPU 51.

Further, this reproduced image data can be used as a background scene of an image that is drawn by the above-described GPU 62, by storing it into the frame buffer 63 through the GPU 62.

The sound system 70 includes a SPU 71 for generating a musical sound, a sound effect and the like, based on an instruction from the CPU 51, a sound buffer 72 into which wave form data and the like are recorded according to the SPU 71, and a speaker 73 for outputting the musical sound, the sound effect and the like that are generated by the SPU 71.

The SPU 71 is includes an ADPCM (Adaptive Differential PCM) decoding function for reproducing voice data of which, for example, 16-bit voice data is adaptive predictive coded as a 4-bit differential signal, a reproducing function for generating the sound effect and the like by reproducing the wave form data stored in the sound buffer 72, and a modulating function for modulating and reproducing the wave form data stored in the sound buffer 72.

The sound system 70 is operable to be used as a so-called sampling sound source that generates a musical sound, a sound effect and the like based on the wave form data recorded in the sound buffer 72 in accordance with an instruction from the CPU 51.

The optical disk control unit 80 includes an optical disk device 81 for reproducing a program, data and the like that has been recorded on the optical disk, a decoder 82 for decoding the program, the data and the like recorded as an error correction code being added thereto, for example, and a buffer 83 for speeding up reading of the data from the optical disk by temporarily storing the data from the optical disk device.

A sub CPU 84 is connected to the decoder 82. Further, as a voice data stored in the optical disk, that is to be read with the optical disk device 81, besides the above-described ADPCM data, there is so-called PCM data of which the voice signal is analog/digital converted.

As the ADPCM data, for example, voice data that is recorded by indicating a differential of 16-bit digital data by 4-bits is supplied to the above-described SPU 71 after having been decoded in the decoder 82, and then is used for driving the speaker 73, after the processes of the digital/analog conversion and the like have been executed in the SPU 71.

Moreover, as the PCM data, for example, voice data that is recorded as 16-bit digital data is used for driving the speaker 73, after having been decoded in the decoder 82.

Furthermore, the communication control unit 90 includes a communication controller 91 for enabling communication with the CPU 51 through the bus BUS. A controller connection unit 9 to which a controller 20 for inputting an instruction from a user is connected, a memory card 10 as a supplemental storage device for storing the setting data and the like of the game, and memory card insertion units 8A, 8B to which the portable electronics equipment 100 is to be connected, are provided in the communication controller 91.

The controller 20 has 16 instruction keys, for example, for inputting instructions from a user, and transmits the instructions to the communication controller 91 about 60 times/second, with a synchronous communication, in accordance with the instruction from the communication controller 91. The communication controller 91 transmits the instructions from the controller 20 to the CPU 51.

As a result, an instruction from a user is inputted into the CPU 51, and the CPU 51 performs a process in accordance with an instruction from a user, based on the game program and the like that are being executed.

Herein, among the main memory 53, the GPU 62, the image decoder 64 and the decoder 82 and the like, it is necessary to transfer a large quantity of the image data at high speed while reading a program, displaying an image or a drawing and the like. Thus, this video game device is operable to perform a so-called DMA transfer of the data directly among the main memory 53, the GPU 62, the image decoder 64 and the decoder 82 and the like according to control from the peripheral device control unit 52 without going through the CPU 51 as described above. As a result, a reduced load of the CPU 51, and high speed data transfer are achieved.

Further, if it is necessary to store the setting data and the like of the game that is being executed, the CPU 51 transmits the data that is to be stored to the communication controller 91, and the communication controller 91 writes the data from the CPU 51 into the memory card 10 or the portable electronics equipment 100 that is inserted into a slot of the memory card insertion unit 8A or of the memory card insertion unit 8B.

Herein, in the communication controller 91, a protection circuit for preventing electrical destruction is installed. The memory card 10 and/or the portable electronics equipment 100 are separated from the bus BUS, and they can be attached/detached when the main body of the device is being energized. Accordingly, when the storage capacities of the memory card 10 and/or the portable electronics equipment 100 run short, and the like, a new memory card may be inserted without shutting down the power supply of the main body of the device. As a result, without losing the game data necessary to be backed up, by inserting a new memory card, the necessary data can be written into the new memory card.

A parallel I/O interface (PIO) 96, and a serial I/O interface (SIO) 97 are interfaces for connecting the memory card 10 and/or the portable electronics equipment 100 with the video game device 1.

In the entertainment system as described above, the refraction mapping according to the present embodiment is implemented.

The embodiments of the system for and method of implementing the refraction mapping of the invention will now be described in detail with reference to the accompanying drawings.

Various techniques are known regarding the mapping. When a man is looking at the water bottom WB through the water surface, as standing by a waterside of a pond or a swimming pool, an object at the water bottom WB looks distorted by refraction. A method of producing a realistic picture of the object being at the water bottom WB, by simulating the refraction described above, is called as refraction mapping.

A similar refraction occurs when observing an object through a transparent glass or the like, other than the water surface. That is, when looking at an object, through two or more kinds of transparent or semi-transparent media, the object looks displaced by refraction of light that is generated at a boundary surface of these media. Accordingly, when producing such a picture of the object, the refraction mapping technique is utilized.

The refraction mapping is a CG (Computer Graphics) technique for mapping, by calculating how an object looks, when refraction intervenes on a line of sight between a view point VP and the object.

In order to make the refraction mapping according to the present embodiment more easily understandable, the procedure of the conventional refraction mapping that is presently implemented will be described.

In the CG image, projecting an object shape onto a two-dimensional screen (a rendering), and mapping a texture for the object shape obtained (a texture mapping) are usually performed.

Figure 5:
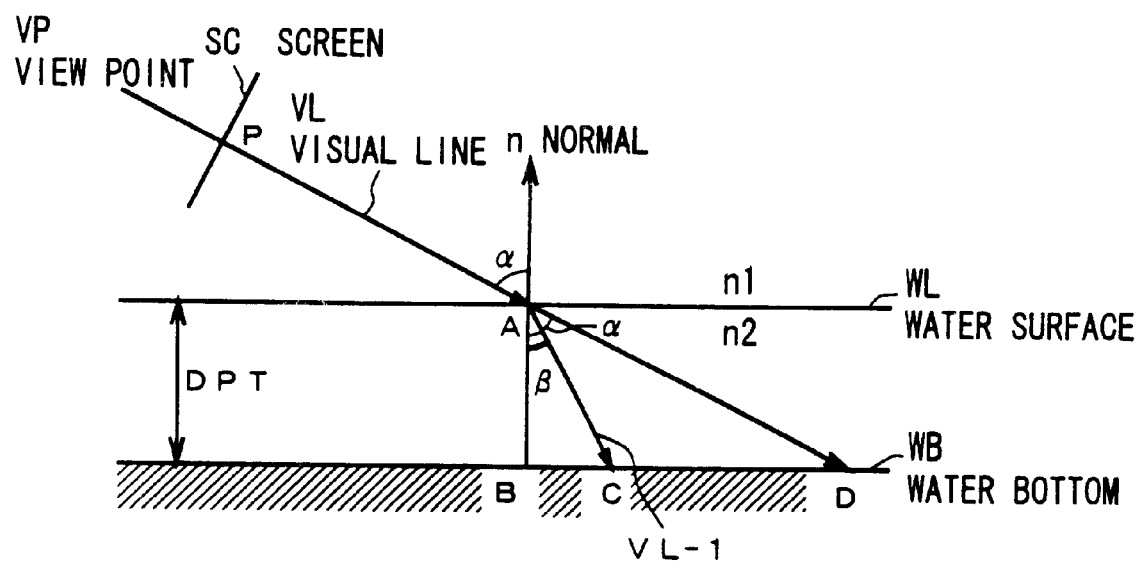
FIG. 5 is a diagram illustrating refraction with respect to a view point and a boundary between air and water.

In FIG. 5 there are shown the water surface WL and the water bottom WB. Water of a depth DPT is between the water surface and the water bottom WB. There is air above the water. Herein, it is assumed that a refractive index of air is $\eta 1$, and a refractive index of water is $\eta 2$.

It is further assumed that the view point VP is at the upper left, and there is a screen SC in front thereof. The view point VP represents a human eye at this location looking at the water bottom (object) therefrom. FIG. 5 shows a line of sight VL toward a point A on the surface of the water from the view point VP, and looking at this point A. In the figure, the line of sight VL travels straight when there is no water, and the line of sight VL is refracted when there is water. Further, in the description herein, it is assumed that the water bottom WB is a flat.

In FIG. 5, when there is no water, the line of sight VL toward the point A from the view point VP travels straight and reaches point D at the water bottom WB. Accordingly, when drawing the water bottom WB on the screen SC, perspective-transforming the point D that constitutes a 3-dimensional object so as to display it as a 2-dimensional figure on the screen SC, rendering, and then texture mapping is performed. That is, when texture mapping, drawing a texture of the point D where the line of sight is across the water bottom WB, at the P on the screen SC.

With the water depth DPT from the water bottom WB, the line of sight VL toward point A from the view point VP reaches point C at the water bottom because refraction occurs at point A of the boundary surface of the air and the water surface. When looking at point A on the water surface from the view point VP, point C at the water bottom is to be seen. Accordingly, the texture of the point C has to be mapped on the point P on the screen SC.

In other words, a light emitted from the point C that exists at the water bottom (the point C that constitutes the object that exists at the water bottom) enters into the view point VP following the visual line VL, as being refracted at the point A on the water surface WL. Because the human eye can not discriminate the refraction, it is under an illusion that the visual line VL toward the point A from the view point VP travels straight and it looks as if point C at the water bottom WB exists at point D.

A description as to how to quantitatively calculate a location of the point C that can be seen when looking at the point A on the water surface from the view point VP is now provided. The location of point C is calculated from Snell's Law as follows. Herein, at point A, a normal direction n is defined as being perpendicular to the water surface WL. It is assumed that an angle formed by the visual line VL and the normal direction n is $\alpha$, an angle formed by the refracted visual line VL-1 and the normal direction n is $\beta$ and a depth of the water is DPT. At this moment, the following equations hold according to Snell's law.

$$\eta 1 \sin \alpha = \eta 2 \sin \beta \quad (1)$$

Herein, as considering a triangle ADB and a triangle ACB, the following relations hold.

$$\sin \alpha = BD/AD \quad (2)$$

$$\tan \beta = BC/AB = BC/DPT \quad (3)$$

From these relations, one may transform equation (1), and substituting equation (2), to form the following equation.

$$\sin \beta = (\eta 1/\eta 2) \sin \alpha = (\eta 1/\eta 2)(BD/AD) \quad (4)$$

Further, between sin and cos, there is the following relation.

$$(\sin \beta)^2 + (\cos \beta)^2 = 1 \quad (5)$$

Transforming equation (3), and substituting equations (4) and (5), the following is obtained.

$$BC = DPT \cdot \tan\beta \qquad (6)$$
$$= DPT \cdot (\sin\beta / \cos\beta)$$
$$= DPT \cdot \sin\beta \cdot \{1 - (\sin\beta)^2\}^{1/2}$$
$$= DPT(\eta 1/\eta 2) \cdot (BD/AD) \cdot \{1 - (\eta 1/\eta 2)^2 \cdot (BD/AD)^2\}^{1/2}$$

Looking at equation (6), DPT is a depth of the water, η1 and η2 are the refractive indices of the air and the water, respectively, and BD and AD are the values that are determined by the visual line VL, thus enabling one to calculate the value of BC. Accordingly, with equation (6), the location of point C that constitutes the object at the water bottom at a time when the water exists can be determined.

As a result, at point P on the screen SC on which point D is drawn when there is no water, point C is drawn in place of point D when there is water. Accordingly, it is possible to render the water bottom WB.

It is assumed in the above description that the water bottom WB is flat. However, in general, an actual topography is not a simple plane and there is usually an unevenness on the surface thereof. It is necessary to draw the water bottom WB in three-dimensional graphics. When rendering topography having such unevenness, the topography texture is not a sheet of texture, but it becomes a polyhedron configured three-dimensionally.

Figure 6:
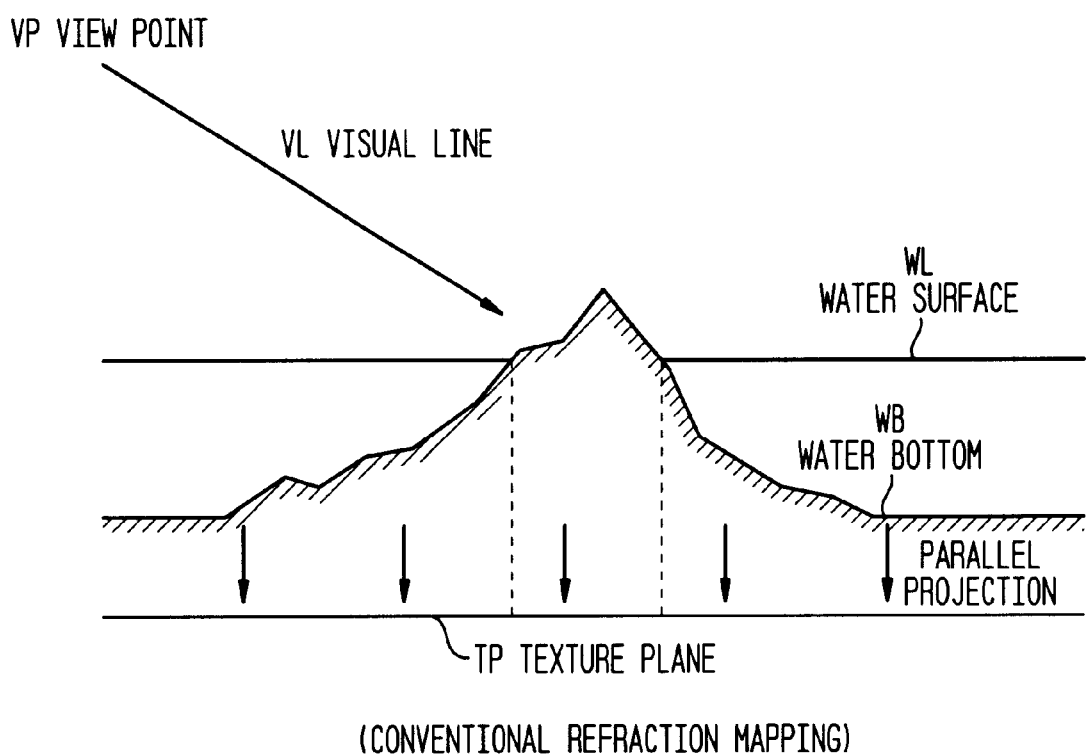
FIG. 6 is a diagram illustrating refraction mapping that is implemented at the present time.

For such case, in FIG. 6, a topographic texture located parallel to the water surface WL is defined beneath the water bottom WB.

Next, for the topography assuming that no water exists, in advance, a two-dimensional texture is produced on this texture plane. Specifically, the following actions are executed: performing a three-dimension calculation for the topography having an unevenness, implementing a shading, and pasting it on a texture plane by parallel-projecting from a direction which is perpendicular to the water surface WL, so as to produce a two-dimensional (flat) texture of this topography.

Then, the refraction mapping is implemented using this two-dimensional topographic texture.

This topography may be continued with the land that is higher than the water surface WL. For the land protruding from the water surface WL, no refraction occurs, so that rendering has to be made by executing a calculation of a perspective transformation that uses a rotation and a coordinate transformation, from a direction of the view point VP.

On the other hand, for the topography under the water (the water bottom WB), because displacement by refraction occurs, the refracted texture address is obtained by calculating an amount of displacement using equation (6) with respect to each of the points that constitute the water bottom WB.

As described above, the conventional method that is presently implemented is very complex. FIG. 7 is a drawing showing one example of an actual conventional refraction mapping.

Figure 7A:
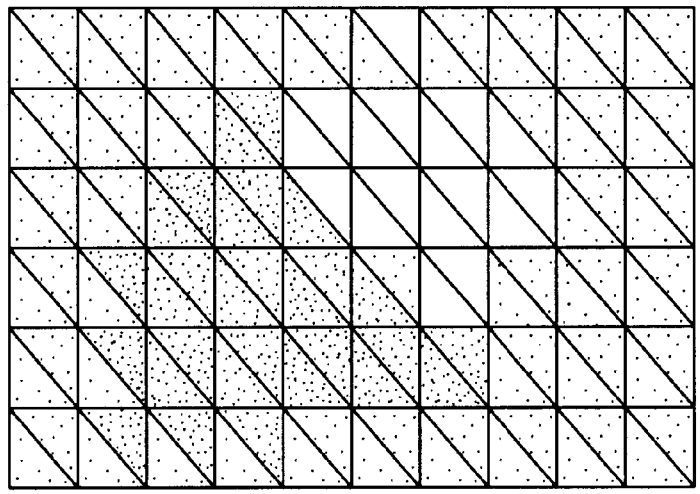
FIG. 7 is a diagram showing an image of a texture along with a procedure of the refraction mapping that is implemented at the present time.

In a first step, implementing a parallel-projection or a parallel paste to the entire topography, for a texture plane which is parallel to the water surface WL is performed. FIG. 7A shows a rendering for the water bottom WB having no water with the parallel-projection. This rendering may be executed in the GPU 62, and it is drawn on a texture area other than a display area of the frame buffer 63, with the data obtained.

Figure 7B:
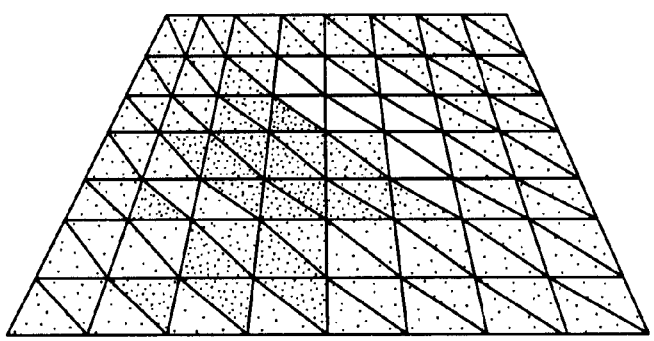

In a second step, because it seems to be refracted when looking at the topographic part under the water in the air, a rendering is made by obtaining the refracted texture address, using Snell's law described above. FIG. 7B shows a state in which an image of the water surface (an image of the water bottom WB that is seen through the water) is produced in a display area of the frame buffer 63, by implementing the refraction mapping, using the memory image of FIG. 7A as the texture.

Figure 7C:
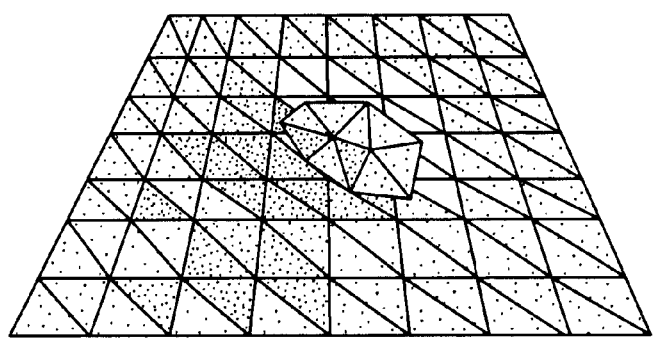

In a third step, because no refraction occurs in the topographic part protruding from the water surface WL, a rendering is made to this topographic part by obtaining a texture address using a perspective transformation technique. FIG. 7C shows a state in which the one on which the water is rendering the land part with the perspective projection is drawn on an image of the water surface that is produced in the display area illustrated in FIG. 7B and thus it is superimposed.

Accordingly, after the parallel projection, it is required to implement the renderings in two directions with the perspective projection. Because this conventional drawing method at the present time implements the renderings in two directions, and superimposes them, the work is more complex, the loads of the CPU and the GPU are much higher, and the drawing time is longer.

A method of implementing refraction mapping according to the present invention is now described. This method of implementing refraction mapping may be programmed, and thus may be recorded on a recording medium such as an optical disk, or may be provided along with game software e.g., as a part of the game software. This program for implementing refraction mapping is activated on the entertainment system, and is executed by the CPU 51.

The program for implementing refraction mapping may be prepared for use by software engineers in advance e.g., as a library, for use in an application program such as game software and the like. As is well known, an enormous amount of time is required to produce all functions of the software anew, at a time of developing software.

However, in general, when decomposing the functions that constitute software into classes of functions, it is appreciated that the functions commonly used for the various kinds of software such as a parallel movement of an object are included, for example.

Thus, it becomes significant to provide the function of implementing refraction mapping according to the present invention, as a library program, for use by a software engineer, in advance. As receiving a supply as a program from an outside in advance, for these common functions, the software engineer enables to concentrate on only an essential part peculiar to that program other than the common functions.

Figure 8:
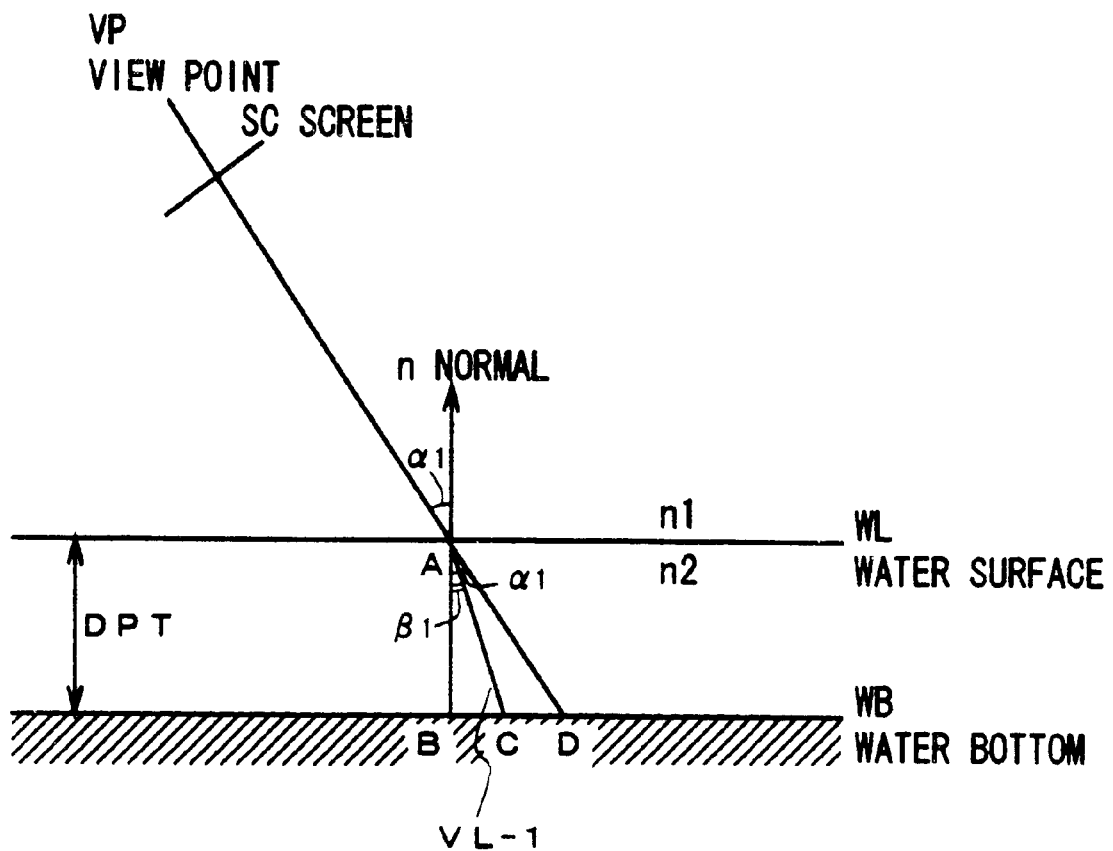
FIG. 8 is a diagram illustrating a situation in which a line of sight from a view point generates refraction at a boundary between air and water, when an angle α formed between the line of sight and a normal line is relatively small compared to FIG. 5.

FIG. 8 shows a case in which an angle α1 formed by the visual line VL and the normal direction n is relatively smaller, as compared to FIG. 5. In such case, refraction at the surface the water WL becomes smaller compared to the one in FIG. 5. In the present embodiment, it is noted that when the angle α formed by the visual line VL and the normal direction n is large, an amount of refraction at the boundary of the air and the water is also large, and on the contrary when the angle α formed by the visual line VL and the normal direction n is small, the amount of refraction is also small. The refraction mapping of the invention is achieved using a simple calculation which qualitatively intimates the above noted characteristics of refraction.

This rendering method is, strictly speaking, not matched with Snell's law, regarding the picture of the water bottom under the water. That is, at a time of rendering, an amount of a displacement generated by refraction will not satisfy Snell's law exactly. However, as obtaining an amount of a displacement that is an approximate to Snell's law using an easy method to be described below, qualitatively rendering the water bottom under the water becomes possible.

Figure 9:
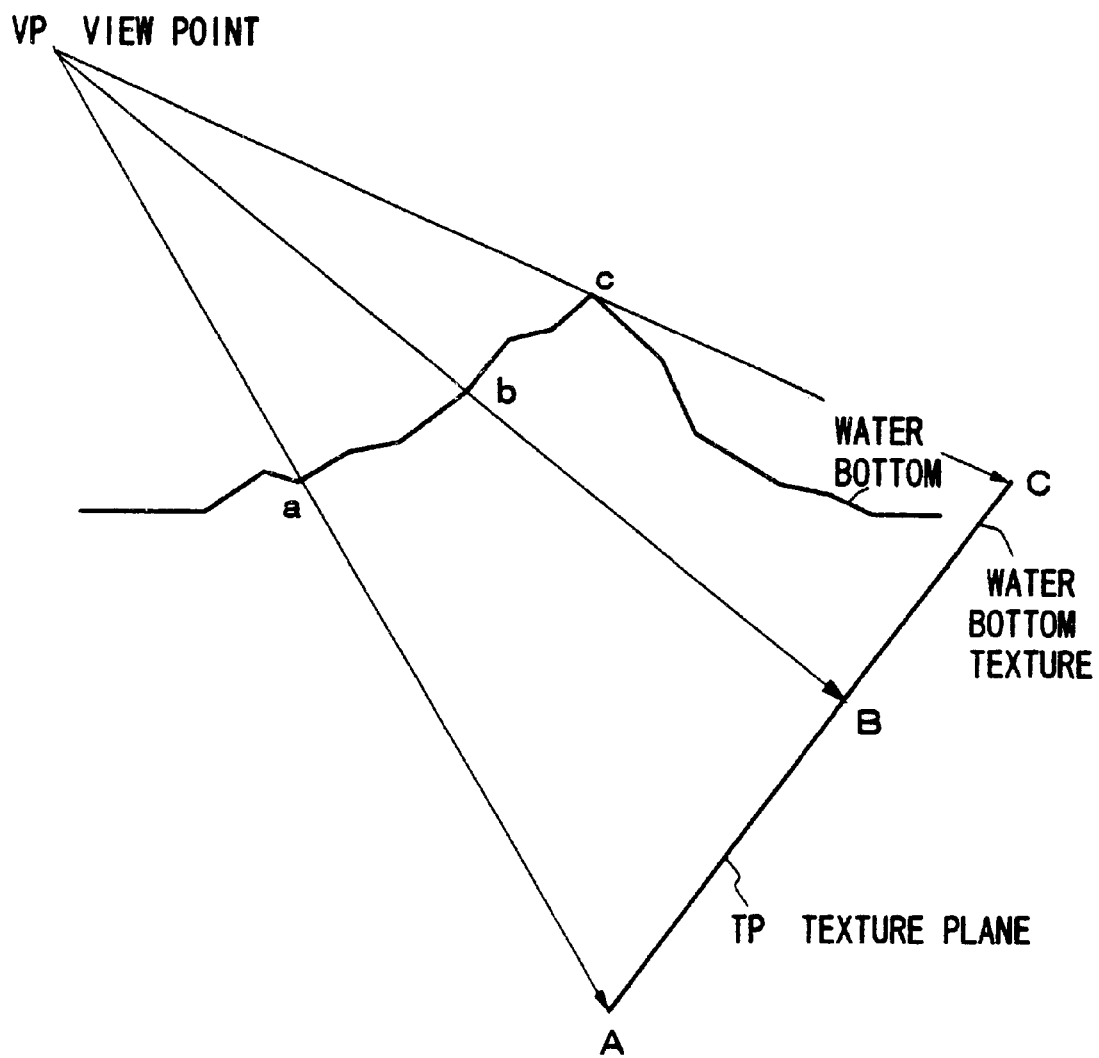
FIGS. 9 and 10 are diagrams illustrating a technique for refraction mapping an object with an uneven contour that is partially under water.

In FIG. 9, a view point coordinate system is set to be a Y-Z plane as shown on the paper of the drawing, and the X-axis is set in a direction perpendicular to the paper.

The present embodiment is, as shown in FIG. 9, a method that defines a texture plane on a plane perpendicular to the Z-axis, and makes it possible to render the part (the water bottom part) under the water surface WL with the same procedure as the perspective projection of the land part protruding from the water surface WL of the topography, and as a result, implementing collectively the land part and the water bottom part with just one rendering.

As shown in FIG. 9, in advance, the one on which an entire topography is drawn by perspective-transforming in the visual line direction is set to be a topographic texture. The topographic texture is placed perpendicular to the Z-axis of the viewpoint coordinate system. Further, the topographic texture plane and the screen surface SC are in a parallel positional relation, At first, when that there is no water, the topography is perspective-projected on the texture plane. A three-dimensional topography is perspective-projected for the texture plane from the view point VP. Concretely, the texture address of the point a that constitutes the topography is set to be the point A on the topographic texture plane, the texture address of the point b that constitutes the topography is set to be the point B on the topographic texture plane, and the texture address of the point c that constitutes the topography is set to be the point C on the topographic texture plane.

Figure 10A:
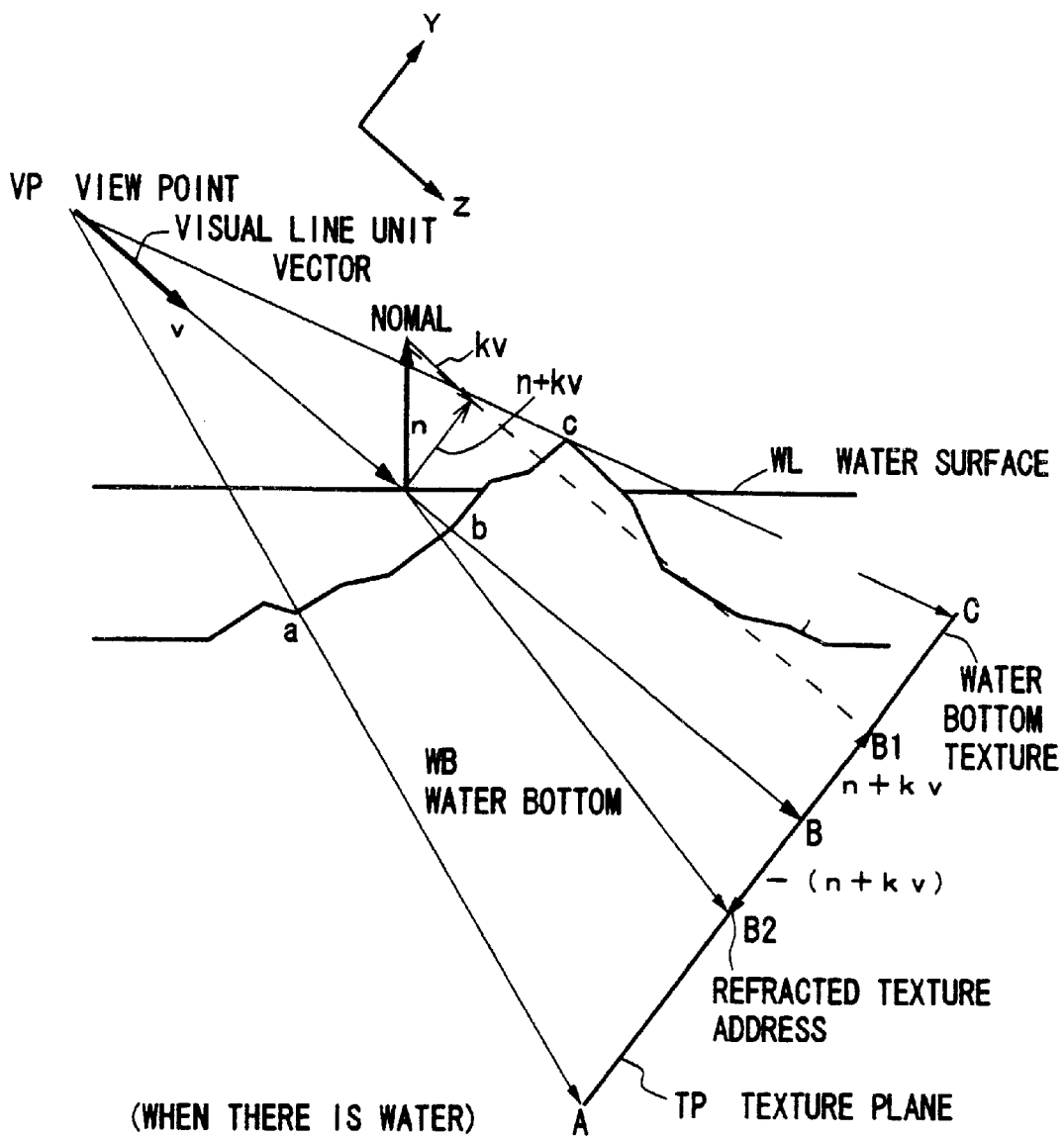
Figure 10B:
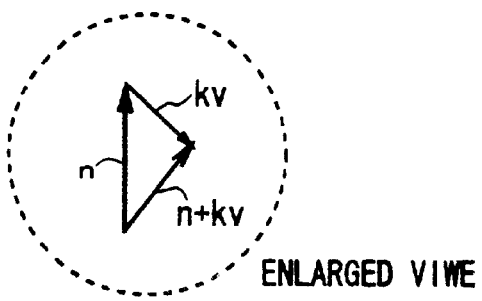

In the next step, for this topography, there is water, and a portion of the topography shown in FIG. 9 is under the water. As shown in FIG. 10, it is a case in which there is water up to the water surface WL, and a portion of the topography that remains is land. In such case, the topography under the water (the part of the water bottom) looks as if it is displaced, according to the refraction at the boundary of the air and the water. In the present embodiment, an amount of this displacement is calculated using an easy calculation method.

In the model as shown in FIG. 10, at an intersection point of the visual line vector and the water surface WL, a normal vector for the water surface WL is set to be n, and the one in which the visual line vector is normalized is set to be a visual line unit vector v. A variable k is determined so that the sum (n+kv) of the normal vector n and the value kv of which the visual line unit vector v is multiplied by a variable k becomes perpendicular to the Z-axis.

As illustrated in FIG. 10, the variable k is determined so that the vector (n+kv) is parallel to the texture plane.

Since the texture plane is placed perpendicular to the Z-axis, if the vector (n+kv) is parallel to the texture plane (i.e., it is on the texture plane), the Z coordinate of the vector (n+kv) becomes zero. Accordingly, the following equation (7) holds.

$$n_z + kv_z = 0 \tag{7}$$

Herein, $n_z$ represents a Z value (scalar quantity) of the normal vector n, and $kv_z$ represents a Z value (scalar quantity) of the vector kv. Transforming equation (7), the following equation (8) is obtained.

$$k = -n_z/v_z \tag{8}$$

Looking at equation (8), $n_z$ is a Z value of the normal vector, and $v_z$ is a Z value of the visual line unit vector, and both are known values. Accordingly, k can be determined from equation (8).

The visual line VL from the air into the water is, as described in relation to FIG. 5, refracted in a clockwise direction at the boundary surface thereof. Accordingly, obtaining (n+kv) using such k, and adding a negative (−) symbol thereto, −(n+kv) is set to be a displacement address of a texture.

Herein, in general, L (n+kv) is used, in which a constant L is multiplied according to the sizes of two kinds of the refractive indices. Further, as a more easy method, among three components ($n_x$, $n_y$, $n_z$) of the normal vector n, L ($n_x$, $n_y$) in which two components ($n_x$, $n_y$) parallel to the texture plane are multiplied by a constant L, may be used as the displacement address.

Mapping the water bottom WB using the displacement address obtained as described above, the rendering is made to the refracted part of the water bottom. Since the land part of the rendering was finished at a time when the perspective projection to the texture plane was performed, by superimposing with this image, the rendering can be made to both parts of the water bottom and the land.

As described above, this rendering method is such that an amount of displacement by refraction will not satisfy Snell's law precisely, regarding the picture of the water bottom under the water. However, by obtaining an amount of displacement that is approximate to Snell's law using an easy method, the rendering can be made qualitatively as to the part of the water bottom under the water.

In the above-described conventional refraction mapping that is implemented at the present rime, it is necessary to perform two directional renderings for a parallel projection and a perspective projection. However, the refraction mapping described in the present embodiment can be implemented using only one directional rendering, by performing the refraction mapping using the water bottom texture produced by the perspective projection and the texture displacement quantity that can be calculated from the normal of the water surface WL and the visual line vector.

Figure 11:
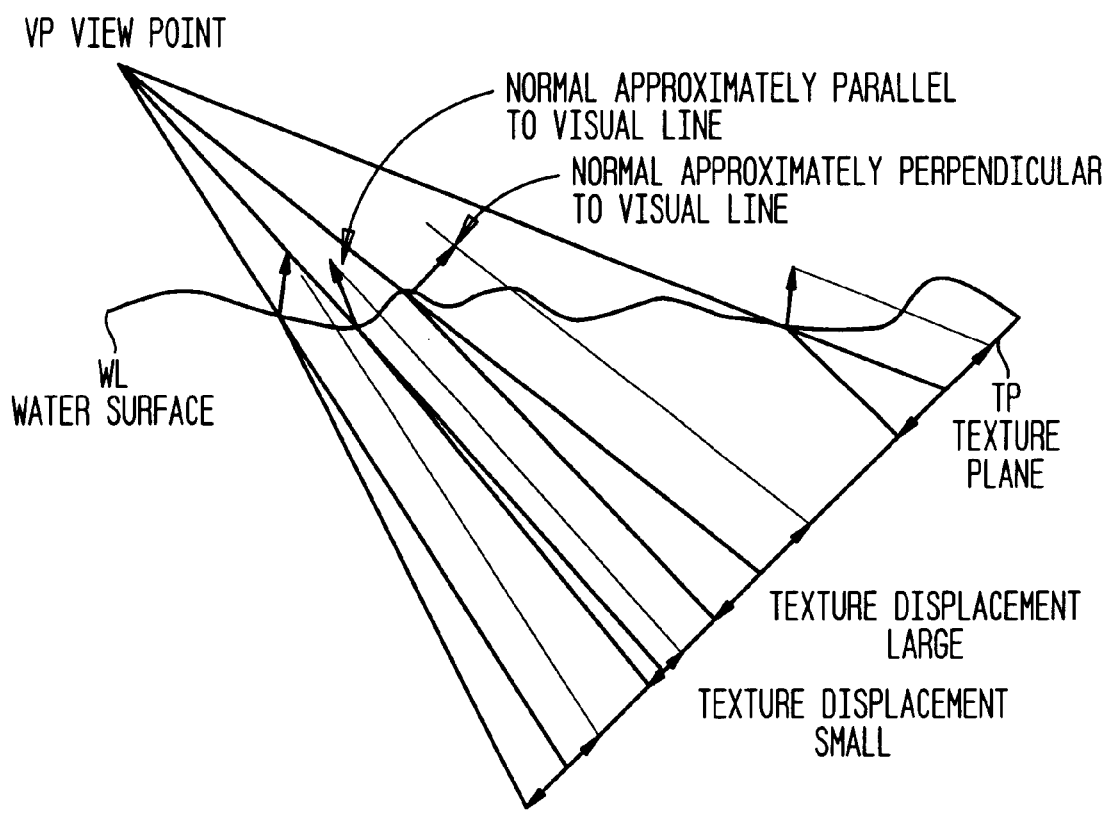
FIG. 11 is a diagram illustrating the refraction mapping when waves occur on the water surface.

Further, as shown in FIG. 10, it is not necessarily true that the water surface WL always forms a flat plane. The water surface of an ocean usually includes waves. FIG. 11 shows the water surface WL on which such waves are formed.

In this case, when the waves are formed on the water surface WL, the angle a formed by the normal n and the visual line VL becomes smaller as the normal n approaches parallel with the visual line VL, and as a consequence, an amount of displacement of the displacement address—(n+kv) becomes smaller. On the contrary, the angle α formed by the normal n and the visual line VL becomes larger as the normal n approached a right-angle with respect to the visual line VL, and as a consequence, an amount of displacement of the displacement address—(n+kv) becomes larger. As a result of this, the one that is an approximate to the displacement according to refraction at the boundary of the air and the water can be obtained.

Figure 12:
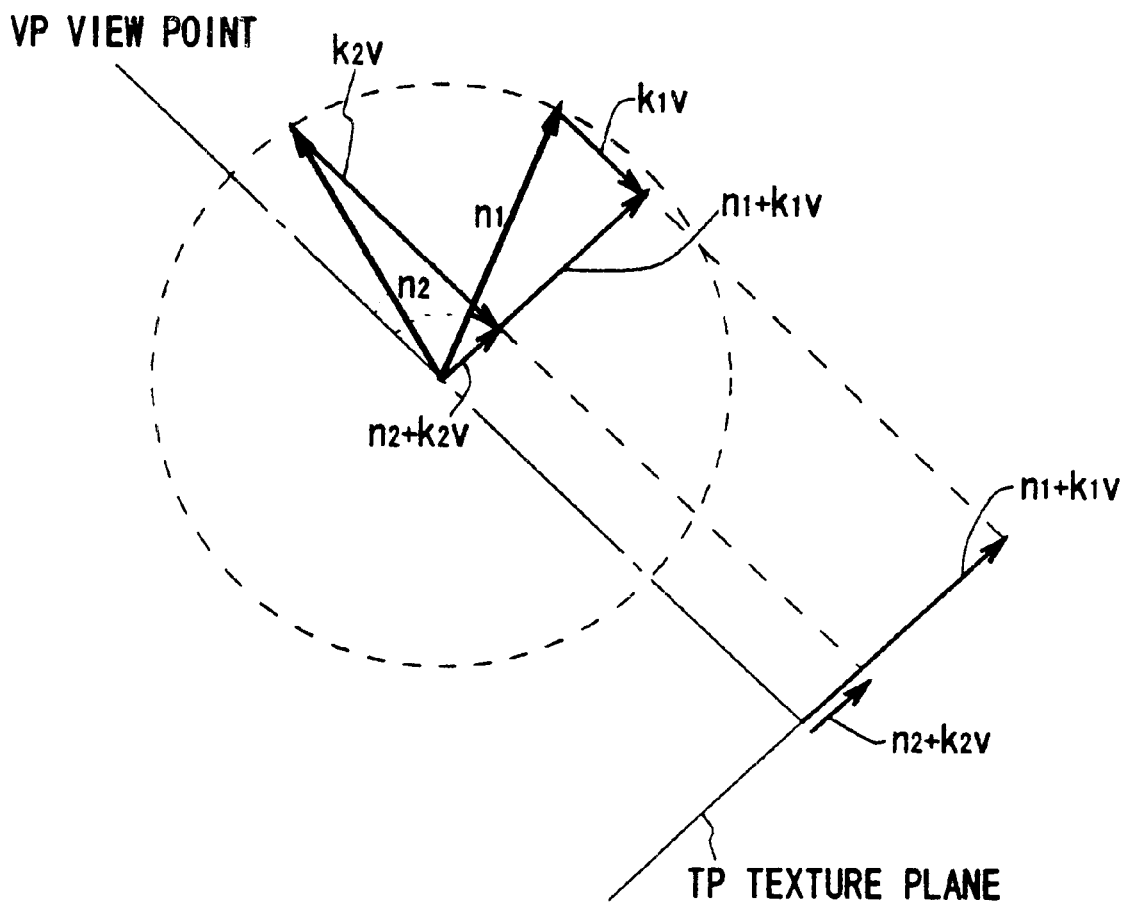
FIG. 12 is a diagram illustrating a relation between a direction normal to the water surface and an amount of displacement that is generated by refraction.

FIG. 12 is a diagram illustrating this relation. The normal vector is such that a direction thereof varies according to a state of a wave. Herein, there are exemplified the normal vector n1 that is approximately perpendicular to the visual line VL, and the normal vector n2 that is approximately in parallel therewith. For the normal vector n1, k1 is determined so that the vector (n1+k1v) is parallel to the texture plane.

Similarly, for the normal vector n2, k2 is determined so that the vector (n2+k2v) is parallel to the texture plane. As described above, by setting the amount of displacement to be—(n1+k1v), —(n2+k2v), depending on the states of waves, the amount of displacement may be relatively large in the normal vector n1 that is approximately perpendicular to the visual line VL, and may be relatively small in the normal vector n2 that is approximately parallel to the visual line VL.

The state of the normal vector n1 that is approximately perpendicular to the visual line VL is a case in which the amount of displacement is relatively large because the angle α is relatively large as shown in FIG. 5, and on the other hand, the state of the normal vector n2 that is approximately parallel to the visual line VL is a case in which the amount of displacement is relatively small because the angle a is relatively small as shown in FIG. 8. As a result, at the water surface WL on which the waves are formed, it is possible to implement the refraction mapping that follows Snell's law qualitatively.

Figure 13A:
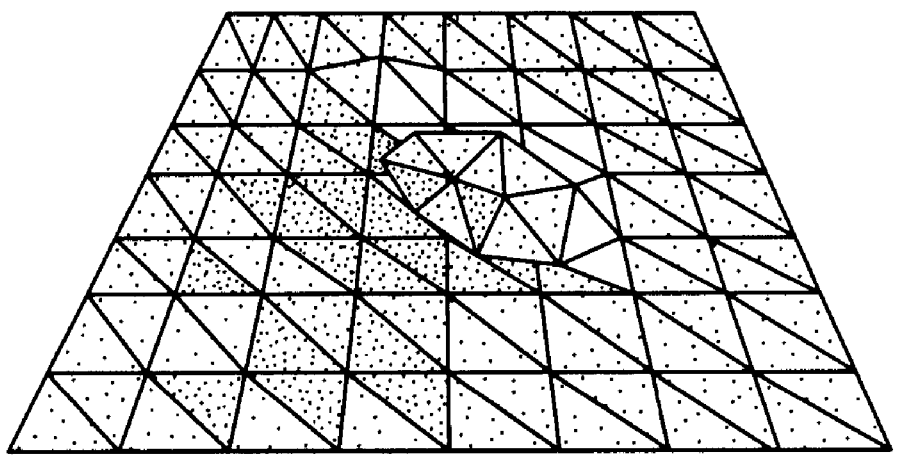
FIG. 13 is diagram showing an image of a texture along with a procedure of the refraction mapping according to the present invention.
Figure 13B:
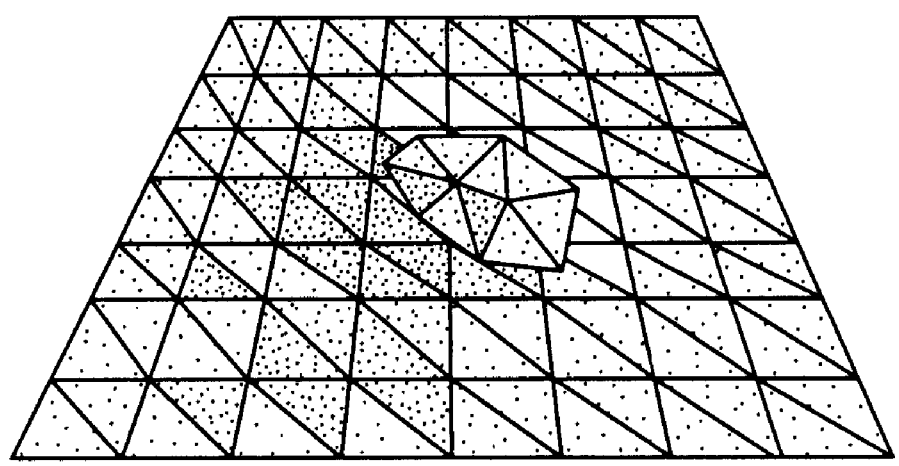

FIG. 13 is a diagram showing one example of the refraction mapping according to the present embodiment. FIG. 13A shows that, in a state of being no water, the one on which a rendering is made to a topography with a perspective projection is drawn to a display area at where it is outputted as a video output of the frame buffer 63. FIG. 13B shows a state in which, with an image of the display area produced in FIG. 13B as a texture, for the water bottom WB under the water surface WL, an image of the water surface (an image of the water bottom WB under the water surface WL) that is produced by implementing the refraction mapping, as an amount of displacement being obtained by a refraction with the above-described easy method, is superimposed with an image of the display area that is drawn in FIG. 13B.

Consequently, at a time when implementing the refraction mapping, without preparing an orthogonal projection of an image that is displayed as being refracted, by modifying the image that is perspective-projected on the screen SC, it can be represented with a simple method.

According to the present invention, it makes possible to provide a system for and a method of implementing refraction mapping with an easy method, as well as a recording media in which this method is recorded.

The invention may be embodied in other specific forms without departing from the spirit or essential characteristics thereof. The present embodiments are therefore to be considered in all respects as illustrative and not restrictive, the scope of the invention being indicated by the appended claims rather than by foregoing description and all changes which come within the meaning and range of equivalency of the claims are therefore intended to be embraced therein.

What is claimed is:

1. A system for implementing refraction mapping, comprising:

means for perspective-projecting an object, and for producing a two-dimensional texture of the object on a texture plane; and means for determining a refracted texture address, which is displaced according to refraction, for at least a portion of the texture, wherein:

the refracted texture address is determined based on a normal vector at a boundary surface of different media and a visual line vector;

the normal vector is defined to be n;

the visual line vector is defined to be v;

the means for determining a refracted texture address determines a variable k so that (n+kv) is parallel to the texture plane; and the refracted texture address is determined by displacing the texture address by L (n+kv), where L is a constant.

2. The system for implementing refraction mapping according to claim 1, further comprising:

means for displacing at least the portion of a texture to obtain a displaced texture, based on the refracted texture address; and means for perspective-transforming the texture on a screen using the displaced texture.

3. The system for implementing refraction mapping according to claim 1, wherein the object has a portion projecting from the boundary surface, and a portion under the boundary surface; and a refracted texture address according to refraction is determined for at least the portion of the object under the boundary surface.

4. The system for implementing refraction mapping according to claim 1, wherein the system for implementing the refraction mapping is provided in a video game device.

5. A system for implementing refraction mapping, comprising:

means for perspective-projecting an object, and for producing a two-dimensional texture of the object on a texture plane; and means for determining a refracted texture address, which is displaced according to refraction, for at least a portion of the texture, wherein:

the refracted texture address is determined based on a normal vector at a boundary surface of different media, the normal vector is defined to be n, and the refracted texture address is determined by displacing a texture address by $L(n_x, n_y)$, where normal vector components $(n_x, n_y)$ are parallel to the texture plane and L is a constant.

* * * * *

UNITED STATES PATENT AND TRADEMARK OFFICE
CERTIFICATE OF CORRECTION

PATENT NO. : 6,563,508 B1
DATED : May 13, 2003
INVENTOR(S) : Masaaki Oka

It is certified that error appears in the above-identified patent and that said Letters Patent is hereby corrected as shown below:

<u>Column 12,</u>
Line 45, "angle a", should read -- angle $\alpha$ --.

<u>Column 13,</u>
Line 13, "angle a", should read -- angle $\alpha$ --.

Signed and Sealed this

Nineteenth Day of August, 2003

JAMES E. ROGAN
*Director of the United States Patent and Trademark Office*